J. H. HILL.
LOCK FOR AUTOMOBILES.
APPLICATION FILED MAY 12, 1919.

1,314,329.

Patented Aug. 26, 1919.

INVENTOR
Joe Herman Hill
BY
Frank P. Shepard
ATTORNEY

UNITED STATES PATENT OFFICE.

JOE HERMAN HILL, OF OKLAHOMA, OKLAHOMA, ASSIGNOR OF ONE-THIRD TO JOHN S. INLOW, OF OKLAHOMA, OKLAHOMA.

LOCK FOR AUTOMOBILES.

1,314,329.          Specification of Letters Patent.    Patented Aug. 26, 1919.

Application filed May 12, 1919. Serial No. 296,298.

*To all whom it may concern:*

Be it known that I, JOE HERMAN HILL, a citizen of the United States, residing at Oklahoma, in the county of Oklahoma and State of Oklahoma, have invented certain new and useful Improvements in Locks for Automobiles, of which the following is a specification, reference being had to the accompanying drawings.

The object of the invention is to provide a cheap, safe, and convenient lock for automobiles.

Figure 1 of the drawings is a front elevation of one end of an automobile axle, together with a steering knuckle, a fragment of a wheel, and the improved lock in locked position.

Like characters of reference designate like parts in all the figures.

Figure 1:
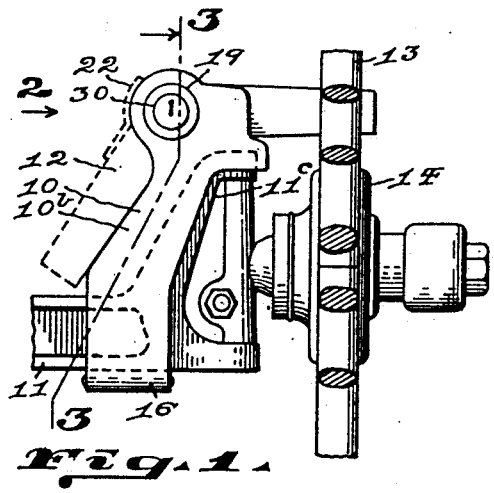

In carrying out the object stated, a supporting arm 10 is fixed to the axle 11 and has a locking-arm 12 pivoted to its upper end, said locking-arm being adapted to be swung over outward with its free end between two spokes 13 of the wheel 14 to lock the latter against movement.

Figure 2:
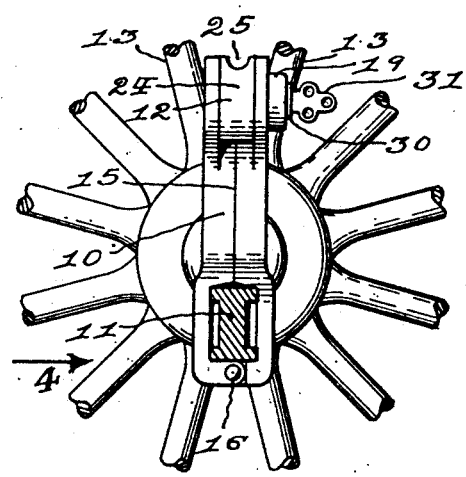
Fig. 2 is a view of the parts shown in Fig. 1, and is taken in the direction of the arrow 2.

In securing the arm 10 to the axle 11, it is made in two separable portions 10$^b$ and 10$^c$ which meet each other on the line 15 of Fig. 2, these portions being hinged together at their lower ends, as at 16, so as to close together with the axle 11 and the pivotal end of the locking-arm 12 between them.

In addition to embracing the axle 11 at their lower ends, the portions 10$^b$ and 10$^c$ of the arm 10 partly embrace the upper fork 11$^b$ of the axle and hook outward and downward over the extreme upper end of said fork, thereby preventing the arm from sliding back along the axle away from the wheel 14.

In arranging to hold the portions 10$^b$ and 10$^c$ together, the face of each is provided with a series of dove-tail projections 17 which interproject the corresponding dove-tail projections of the other, a rod 18 being inserted down through the projections and screwthreaded into the lowermost projection to lock the portions 10$^b$ and 10$^c$ together.

Figure 3:
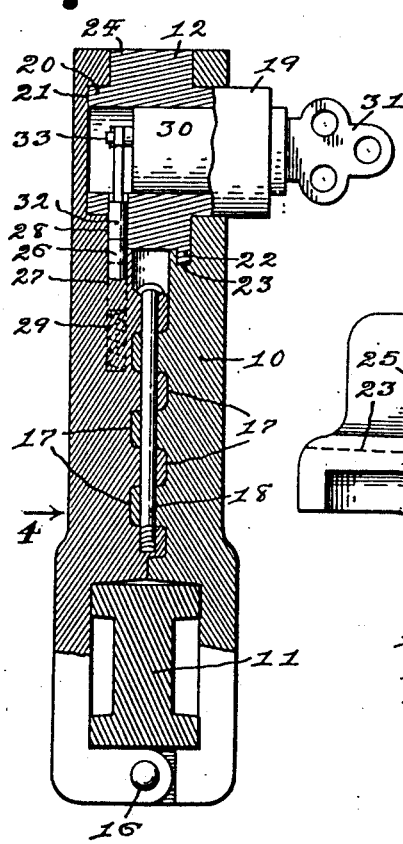
Fig. 3 is an enlarged sectional view taken on the line 3—3 of Fig. 1.

In pivoting the locking-arm 12 to the arm 10 said locking-arm is provided with trunnions 19 and 20, the front trunnion 19 extending forward pivotally through the upper pivotal end of the front portion 10$^b$ of said arm 10 while the rear trunnion 20 extends into a pivotal recess 21 in the rear portion 10$^c$ as best shown in Fig. 3.

With the locking-arm 12 in locked position, locking-tongues 22, which depend integrally from each edge of the lower face of said locking-arm at its pivotal end, engage grooves 23 in the portions 10$^b$ and 10$^c$ of the supporting arm 10.

This arrangement locks the upper ends of the two portions 10$^b$ and 10$^c$ together, and relieves part of the strain on the rod 18 and dove-tail projections 17 in case an attempt is made to split the arm 10 apart.

Figure 5:
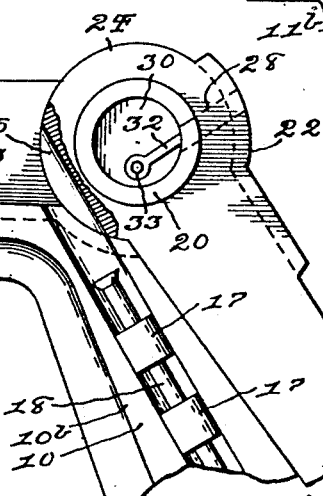
Fig. 5 is an elevation view in the same direction as Fig. 4, but with one of the mating portions of a supporting arm removed and the fragment of the axle omitted, and with a locking-arm swung to unlocked position.

It will be seen that in assembling the portions 10$^b$ and 10$^c$ the locking-arm 12 must be in some position other than locked position, for example in the unlocked position shown in Fig. 5, and in order that the pivotal enlargement 24 of said locking-arm shall not interfere with putting in the pin 18 said enlargement may be cut away as at 25 in said figure.

To lock the locking-arm 12 in position to hold the wheel 14, a locking-pin 26 is set slidably in a hole 27 in the portion 10$^c$ of the arm 10 and is yieldably held up in engagement with a hole 28 in the pivotal portion 24 of said locking-arm by a spring 29 in the bottom of said hole 27.

In providing means for releasing the engagement of the locking-pin 26, a locking-barrel 30, which may be of the well-known "pin" type and operable only by a key 31 of the right combination, is revolubly mounted in the pivotal enlargement 24 of the locking-arm 12 and in axial alinement therewith; and a disengaging plunger 32, adapted to force the locking-pin 26 downward, is pivotally connected to a small wrist-pin 33 on the inner or rear end of said locking-barrel.

Figure 4:
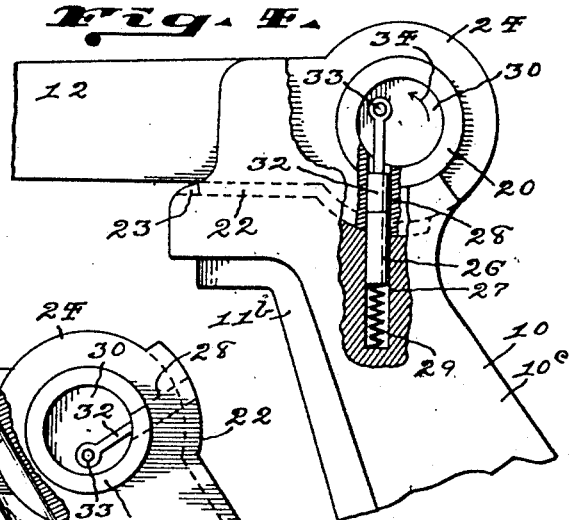
Fig. 4 is a fragmental elevation view in the direction of the arrows 4 of Figs. 2 and 3, with parts broken away to expose interior construction.

By turning the locking-barrel 30 in the direction of the arrow 34 in Fig. 4, the plunger 32 is caused to force the locking-pin 26 downward out of engagement with the locking-arm 12 and said locking-arm may be swung over to the unlocked position shown in Fig. 5.

The following is claimed:—

1. An arm adapted to be attached to a vehicle axle, said arm comprising two separable portions adapted to embrace the axle, a locking-arm interposed between the two portions of the arm and pivoted to said portions, and means whereby said locking-arm binds the two portions of said arm together when moved pivotally between them.

2. An arm adapted to be attached to a vehicle axle, said arm comprising two separable portions adapted to embrace the axle, a locking-arm pivoted to and between said portions and adapted to be swung into locking engagement with a wheel, the locking-arm having locking-tongues, the two arm portions having grooves to receive said locking-tongues, the locking-tongues being so placed on the locking-arm that when the latter is swung from locking position said locking-tongues engage said grooves, and when said locking-arm is swung from locking position said locking-tongues are withdrawn from said grooves.

3. A supporting arm, a locking-arm pivoted to the supporting arm, a locking-pin carried slidably in the supporting arm, to engage and lock the locking-arm, yieldable means holding said locking-pin to said locking-arm, a locking-barrel mounted revolubly in the locking-arm and operable by a key, a plunger carried slidably in the locking-arm to force the locking-pin out of engagement with said locking-arm, said plunger being connected to and operable by said locking-barrel.

Witness my hand this 3rd day of May, 1919.

JOE HERMAN HILL.

Copies of this patent may be obtained for five cents each, by addressing the "Commissioner of Patents, Washington, D. C."